United States Patent
Muench et al.

(10) Patent No.: US 9,016,137 B2
(45) Date of Patent: Apr. 28, 2015

(54) DEVICE FOR THE CONTACTLESS FLOW MEASUREMENT OF FLUIDS IN FLEXIBLE TUBES

(75) Inventors: Hans-Joachim Muench, Halle/S. (DE); Santer zur Horst-Meyer, Halle/S. (DE); Tobias Fritsche, Halle/S. (DE); Jürgen Kahle, Leipzig (DE); Werner Krause, Halle/S. (DE); Nicki Bader, Halle/S. (DE)

(73) Assignee: Sonotec Ultraschallsenosorik Halle GmbH, Helle/S. (DE)

( * ) Notice: Subject to any disclaimer, the term of this patent is extended or adjusted under 35 U.S.C. 154(b) by 295 days.

(21) Appl. No.: 13/472,404

(22) Filed: May 15, 2012

(65) Prior Publication Data

US 2013/0305839 A1    Nov. 21, 2013

(51) Int. Cl.
*G01F 1/66* (2006.01)

(52) U.S. Cl.
CPC ........................................ *G01F 1/667* (2013.01)

(58) Field of Classification Search
CPC ....... G01F 1/6882; G01F 1/6847; G01F 1/68; G01F 1/662; G01F 1/66; G01F 1/56
USPC ............... 73/861.11–861.15, 861.25–861.31, 73/861.18
See application file for complete search history.

(56) References Cited

U.S. PATENT DOCUMENTS

| | | | | |
|---|---|---|---|---|
| 4,374,477 | A | * | 2/1983 | Kikuchi et al. ............. 73/861.18 |
| 4,454,767 | A | * | 6/1984 | Shinkai et al. ............. 73/861.18 |
| 4,899,592 | A | * | 2/1990 | Behrens ..................... 73/861.11 |
| 5,179,862 | A | * | 1/1993 | Lynnworth ................. 73/861.28 |
| 5,220,841 | A | * | 6/1993 | Brown et al. .............. 73/861.12 |
| 5,325,728 | A | * | 7/1994 | Zimmerman et al. ..... 73/861.12 |
| RE34,686 | E | * | 8/1994 | Coyle et al. ............... 73/861.21 |
| 6,212,959 | B1 | * | 4/2001 | Perkins ...................... 73/861.77 |
| 6,418,796 | B1 | * | 7/2002 | Baumoel .................... 73/861.27 |
| 2004/0254469 | A1 | | 12/2004 | Shkarlet et al. |
| 2005/0209552 | A1 | * | 9/2005 | Beck et al. ...................... 73/861 |
| 2006/0174716 | A1 | * | 8/2006 | Zajac et al. ............... 73/861.12 |

(Continued)

FOREIGN PATENT DOCUMENTS

| | | |
|---|---|---|
| DE | 285637 A5 | 12/1990 |
| DE | 9202970 U1 | 9/1992 |

OTHER PUBLICATIONS

Beuthner, Andreas, Sensor technology driven by usability, Meditec International, Nov. 1, 2011, pp. 54-55.

(Continued)

*Primary Examiner* — Lisa Caputo
*Assistant Examiner* — Philip Cotey
(74) *Attorney, Agent, or Firm* — VLP Law Group LLP; Kent H. Cheng (57) ABSTRACT

For flow measurement a device with a compact housing and a fixable hinged cover has a measuring channel for inserting a flexible tube such that it becomes deformed in a defined way. The measuring channel extends over the entire width of the housing. A measuring cell arranged in the center of the measuring channel has
   four ceramics I, II, III, IV, integrated in a sound-decoupled way and facing each other diagonally in pairs, which are placed in lateral parts on the left and on the right of the measuring cell, and a base plate limiting the measuring cell downwards in the direction of an installation space for an electric evaluation system, wherein the base plate also limits the remaining area of the measuring channel from below.

6 Claims, 6 Drawing Sheets

(56) References Cited

U.S. PATENT DOCUMENTS

| | | | |
|---|---|---|---|
| 2007/0017286 A1* | 1/2007 | Gehman et al. | 73/204.27 |
| 2008/0001766 A1* | 1/2008 | Stambaugh et al. | 340/603 |
| 2009/0050809 A1* | 2/2009 | Holec | 250/343 |
| 2010/0180692 A1* | 7/2010 | Reichart et al. | 73/861.11 |
| 2011/0071465 A1* | 3/2011 | Wang et al. | 73/861.42 |

OTHER PUBLICATIONS

Anonymous, Operators Manual—Transonic Flow Loop for Bioprocess, Transonic Systems Inc, Dec. 31, 2009.

\* cited by examiner

DEVICE FOR THE CONTACTLESS FLOW MEASUREMENT OF FLUIDS IN FLEXIBLE TUBES

FIELD OF THE INVENTION

The invention relates to a device for the contactless flow measurement of fluids in flexible tubes, the diameter of which is clearly below 12 mm. The measurement of the flow of sound-transparent liquids by non-invasive means on flexible tubes is known from prior art, and it is performed up to the diameter ranges as stated above, with the transit time difference method also representing a known method for working with such a device.

BACKGROUND OF THE INVENTION

Prior art may be exemplified by products of the companies em-tec GmbH, D-86923 Finning or Transonic Systems Inc., New York 14850, USA.

Thus, the company em-tec GmbH offers a clamp-on transducer for measuring a flow in extracorporeal tubing systems, as available for checking on the website http://www.em-tec.de of said company. The sensor placed in a housing is clamped on a tube by a click closure, and the measurement is thus taken non-invasively. Applications can be found in medicine, e. g. in measurements which have to be taken at a heart-lung machine in intensive care medicine.

A similar transducer is mentioned as a bypass flowmeter and tubing sensor by the company Transonic Systems Inc., as described in HT100 Bypass Flowmeter & Tubing Sensor, "Surgery/ICU Products" on the website http://www.transonic.com.

This solution also uses a clamp-on tubing sensor, which may be sterilized and attached to flexible tubes in operating theatres. Here, a section of a flexible tube is located in a measuring channel, without applying external mechanical pressure, wherein the ultrasonic signals are coupled in the direction of the liquid flow or against it.

The previously known solutions of the prior art, as exemplified above, make use of an arrangement of clamp-on sensors in which transmitter/receiver transducer and the electronic evaluation system are physically separated, which may cause crosstalk of the signals on the connection line between them. A measurement on smaller tube sizes has not been offered so far.

The disadvantages of the examples of the prior art, as mentioned above, must therefore be overcome.

Therefore, the object of the invention is to propose a device for the contactless flow measurement of fluids for applications in medicine, industry and others, in which the sound emitting and receiving ceramics (piezoelectric elements) are integrated in such way that they are decoupled from the other components, to the end that the signals of the ceramics do not interfere with each other, fewer transverse vibrations or directional effects are caused by using composite ceramics with an optimized width/thickness ratio, and a comparatively simple electronic evaluation system—without using an A/D transducer—is provided for the device as well as the measuring space in the housing of the device should embodied as a measuring channel in such way that, by exchanging few components in the sense of a modular concept, the insertion of a flexible tube within a defined range of usable diameters into the preferably rectangular measuring channel is made in such way that the surface for coupling sound signals into the fluid flowing in a flexible tube is as large as possible, wherein the assessment of received measurement signals should bring a high level of significance—even in consideration of a varying temperature and therefore a different viscosity of the fluid flowing through the flexible tube.

The object of the invention is achieved as follows, referring to patent claim 1 with regard to the basic inventive concept. Further embodiments of the invention are shown in claims 2 through 8.

The device is basically designed as a sensor for measuring the flow rate of a sound-transparent medium in a flexible tube of a low diameter, preferably within an outside diameter range of at least 3.5 mm, in a so-called clamp-on design.

It consists of a compact, in particular plastic housing with a hinged cover made of the same material, attached to its top side, which is fixed by means of a spring-loaded rest hook in the closed state of the housing. On the outside of the housing, opposite the closure of the hinged cover, there is a service interface for the connection to peripheral imaging systems or for voltage supply, as the case may be.

When the hinged cover is opened, a rectangular measuring channel, open to the outside, which extends over the entire width of this surface, becomes visible in the upper area of the housing. Its dimensioning is made in such way that a flexible tube of a defined diameter may be inserted by slight mechanical pressure, through which the wall of the flexible tube fits to the walls of the measuring channel and the underside of the hinged cover covering the measuring channel from above in a rectangular shape when the hinged cover is closed. In the centre of the measuring channel, in the upper housing area limiting the compact housing to the top, there is a measuring cell with ceramics (piezoelectric elements) facing each other diagonally in pairs, which are held in lateral parts, which measuring cell is limited from below by a base plate in the installation space of the compact housing. The base plate in its consistency also forms a bottom limiting the measuring channel overall.

Furthermore, a feature of the invention can bee seen in that the housing of the device has distances at least twice as long in relation the width of the measuring channel for a tube inlet and for a tube outlet for inserting the flexible tube. In this way, a tube inlet or outlet of a defined length, as a section of the measuring channel, contributes to calming the fluid flowing through the flexible tube, which improves measuring stability.

In order that a measuring result of received signals always gives a real picture of the flow volume of a sound-transparent fluid, also the temperature of the latter must be considered because temperature-related changes in viscosity can accelerate or slow down the flow. Therefore, a temperature sensor, the measuring values of which are used as a coefficient for determining the flow volume by way of calculation, is attached to one side of the measuring cell.

An outstanding feature of the invention is that the measuring channel may be enlarged in its cross-section—without changing its width—, starting from a square up to a standing rectangle, by the modular exchange of the base plate, which limits the measuring channel and the measuring cell on the bottom side, which allows to detect flexible tubes with a low outside diameter, from at least 3.5 mm and beyond, within defined limits.

Therein, the dimensions of the measuring cell, consisting in particular of the ceramics integrated into the lateral parts at a defined distance, remain unchanged to the extent technically reasonable. The ceramics are in particular designed as composite ceramics, and the individual elements of the measuring cell are not connected to each other in a compact casting. A joint casting with the electronic evaluation system, which is located below the measuring cell in the installation space for electronic modules, is not present either. Such decoupled design of the device, which may also be regarded as a miniaturisation in this order, avoids negative influences on the sending and receiving of measuring signals by crosstalk of the ceramics.

In addition, for improving the measuring quality, it is provided that the compact housing of the device together with the hinged cover is made of a material which provides shielding against electromagnetic waves from the environment. An appropriate plastic material is suitable for this.

Below the measuring cell there is an installation space for electronic components in the housing of the device.

It comprises:
a) a multiplexer for a transmitted signal,
b) a multiplexer for a received signal,
c) an adjustable amplifier for received signals in connection with a zero-crossing comparator,
d) a time to digital converter (TDC), which is configured and controlled by a microcontroller (MC),
e) a transmitter,
f) a microcontroller (MC) as central control unit,
g) an output circuit,
h) a service interface, and
i) an operating voltage supply.

BRIEF DESCRIPTION OF THE DRAWINGS

The invention shall hereinafter be explained in more detail by way of an embodiment. Therefore, reference is made to FIGS. 1 through 6 in which.

DETAILED DESCRIPTION OF THE INVENTION

Figure 1:
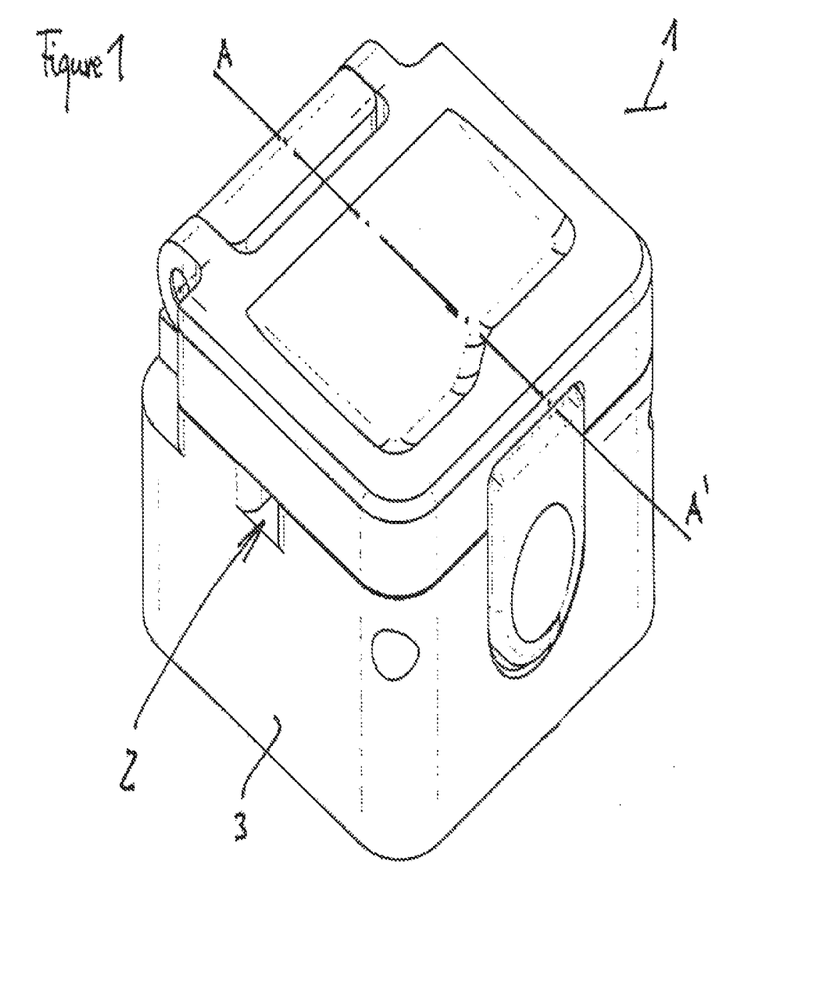
FIG. 1 shows a perspective representation of the device with a closed cover.
Figure 5:
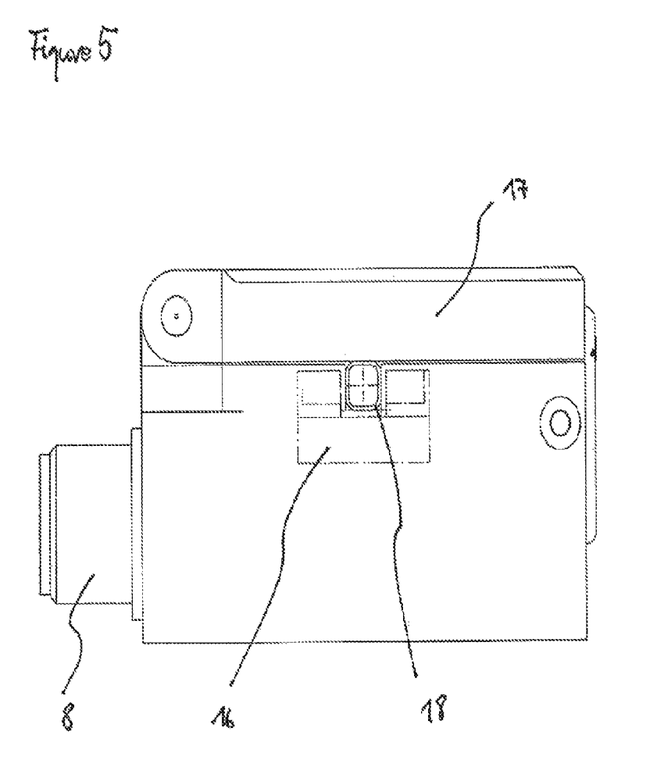
FIG. 5 shows a side view from the left with a local section of the measuring cell.

According to FIG. 1, the device is illustrated as a sensor 1 with a compact housing 3 with a closed hinged cover 17, wherein a tube inlet and a tube outlet 5, 6, leading into the inside of the housing 3 in a defined position, form a measuring channel 2 on the left and on the right under the hinged cover 17 in the upper area of the lateral walls of the housing 3. In this embodiment, the measuring channel 2 has a square cross-section, to which fits a flexible tube 18 by means of slight mechanical pressure when the hinged cover 17 is closed. This generates a largest possible surface for coupling the sound signals into a fluid flowing through the flexible tube 18. The deformation of the flexible tube 18 is illustrated by FIG. 5.

Figure 2:
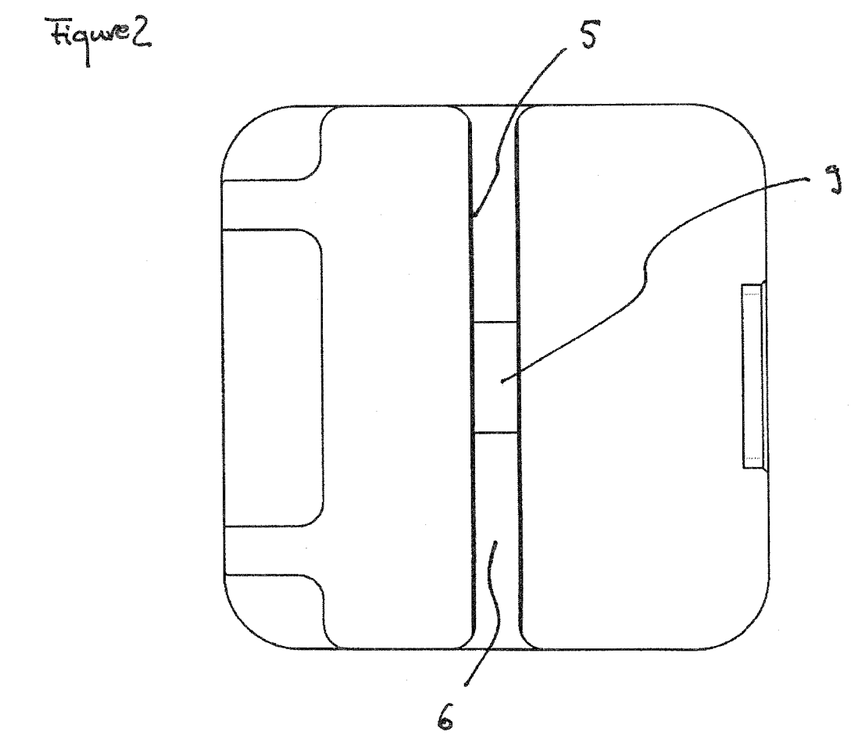
FIG. 2 shows a top view in accordance with FIG. 1.
Figure 3:
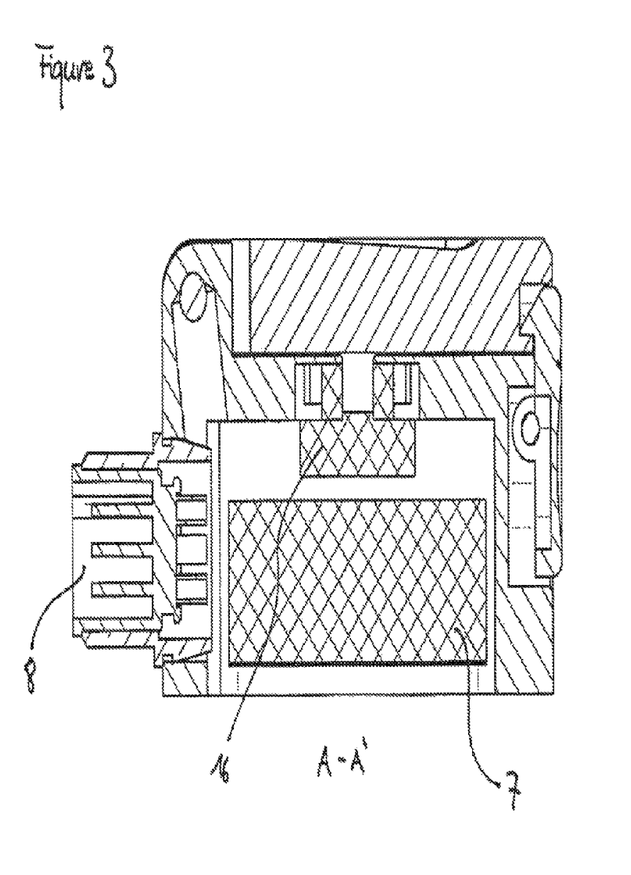
FIG. 3 shows a longitudinal section A-A in accordance with FIG. 1.
Figure 4:
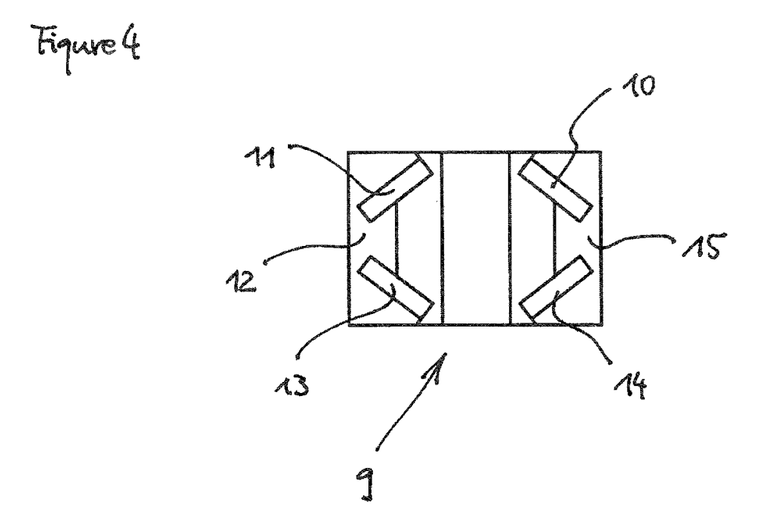
FIG. 4 shows a top view of the measuring cell.

FIG. 2 shows a top view of the length of the measuring channel 2 with tube inlet and tube outlet 5, 6, wherein the measuring cell 9 is arranged centrally in the middle of the measuring channel 2. The measuring cell 9 consists of ceramics, that is piezoelectric elements, ceramics I through IV; 10, 11, 13, 14, inserted in pairs in a lateral part on the left and a lateral part on the right 12, 15, which serve as sending and receiving elements for the sound signals. The bottom limitation of the measuring cell as well as of the measuring channel 2 is formed by a variable-thickness base plate 16. Below the measuring channel 2 or the measuring cell 9, there is an installation space for an electronic evaluation system 7, which is on its part connected to peripheral imaging systems, which are not further illustrated, and an operating voltage supply by way of a sensor connection 8.

Figure 6:
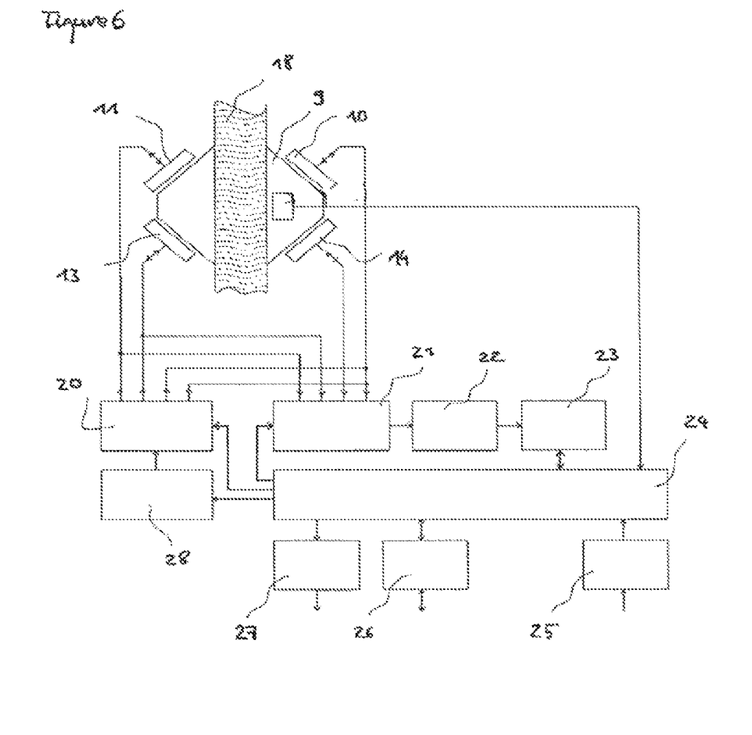
FIG. 6 shows the position of the ceramics and a block diagram for the electronic modules of the device.

The schematic representation in FIG. 6 shows how the measuring cell 9 is in operative connection with the electronic evaluation system 7 and which modules the electronic evaluation system 7 comprises. This embodiment provides in particular a transmitted signal multiplexer 20, a received signal multiplexer 21, a received signal amplifier 22, a TDC 23, a microcontroller 24, an operating voltage supply 25, a service interface 26, an output circuit 27, and a transmitter for US signals 28.

The design of the measuring cell 9 and the components of the electronic evaluation system 7 is a decoupled one, that is, a compact casting of all components does not take place. This avoids a crosstalk of the transmitted and received signals, as stated above, and the quality of detection is improved.

In summary, the advantages of the invention are seen in the:
decoupled design of the components of the measuring cell,
variable cross-section of the measuring channel for multiple flexible tube diameters within defined limits,
possibility to take measurements on flexible tubes with a low outside diameter from 3.5 mm,
optimum protection of the sensor against influences from the environment by means of a shielded housing.

The invention claimed is:

1. A device for the contactless flow measurement of fluids in flexible tubes, consisting of a compact housing with a fixable hinged cover under which there is, on the upper housing limit, below the hinged cover, a measuring channel with
a rectangular cross-section, wherein the measuring channel extends over the entire width of the housing and is configured for insertion of a flexible, such that the flexible tube is deformed in a defined way in a measuring cell which is arranged in the centre of the measuring channel and wherein:
four ceramics I, II, III, IV, are integrated in the device around the centre of the measuring channel in a sound-decoupled way and facing each other diagonally in pairs, which are placed in lateral parts on the left and on the right of the centre of the measuring channel, and a base plate limiting the measuring cell downwards in the direction of an installation space for an electronic evaluation system, wherein the base plate also limits the remaining area of the measuring channel from below, and wherein the base plate is embodied in such way that it can be exchanged according to a modular concept and therefore a change of the geometry of the measuring channel regarding its cross-section from the shape of a square to the shape of a standing rectangle can be carried out.

2. The device for the contactless flow measurement of fluids according to claim 1,
wherein the housing of the device has distances at least twice as long in relation to the width of the measuring channel for a tube inlet and for a tube outlet for inserting the flexible tube.

3. The device for the contactless flow measurement of fluids according to claim 1,
wherein a temperature detector is attached to one side of the measuring channel beside the measuring cell.

4. The device for the contactless flow measurement of fluids according to claim 1,
wherein the compact housing together with the hinged cover is made of a material which has a shielding effect against electromagnetic waves from the environment.

5. The device for the contactless flow measurement of fluids according to claim 1,
   wherein the outside diameter of the flexible tube flown through by a fluid is at least 3.5 mm and a flexible tube of a defined larger outside diameter may also be inserted into the measuring channel by changing its cross-section to a rectangular shape, with its width remaining constant.

6. The device for the contactless flow measurement of fluids according to claim 1,
   wherein the electronic evaluation system in the installation space for the electronic modules comprises:
   a) a multiplexer for a transmitted signal,
   b) a multiplexer for a received signal,
   c) an adjustable amplifier for received signals in connection with a zero-crossing comparator,
   d) a time to digital converter (TDC), which is configured and controlled by a microcontroller (MC),
   e) a transmitter,
   f) a microcontroller (MC) as central control unit,
   g) an output circuit,
   h) a service interface, and
   i) an operating voltage supply.

\* \* \* \* \*